United States Patent
Krishnamurthy

(10) Patent No.: US 11,298,622 B2
(45) Date of Patent: Apr. 12, 2022

(54) IMMERSIVE CROWD EXPERIENCE FOR SPECTATING

(71) Applicant: Sony Interactive Entertainment Inc., Tokyo (JP)

(72) Inventor: Sudha Krishnamurthy, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/660,787

(22) Filed: Oct. 22, 2019

(65) Prior Publication Data
US 2021/0113929 A1    Apr. 22, 2021

(51) Int. Cl.
| | | |
|---|---|---|
| *A63F 13/86* | (2014.01) | |
| *G06F 3/01* | (2006.01) | |
| *A63F 13/56* | (2014.01) | |
| *A63F 13/23* | (2014.01) | |
| *A63F 13/816* | (2014.01) | |
| *G06K 9/00* | (2022.01) | |
| *H04L 67/10* | (2022.01) | |

(52) U.S. Cl.
CPC ............. *A63F 13/86* (2014.09); *A63F 13/23* (2014.09); *A63F 13/56* (2014.09); *A63F 13/816* (2014.09); *G06F 3/011* (2013.01); *A63F 2300/1025* (2013.01); *A63F 2300/577* (2013.01); *G06F 2203/011* (2013.01); *G06K 9/00302* (2013.01); *G06K 9/00335* (2013.01); *H04L 67/10* (2013.01)

(58) Field of Classification Search
CPC ............. G06F 3/011; G06K 9/00302; G06K 9/00335; A63F 13/86; A63F 2300/577; A63F 13/23; A63F 13/56; H04L 67/10
See application file for complete search history.

(56) References Cited

U.S. PATENT DOCUMENTS

| | | | |
|---|---|---|---|
| 8,795,086 B2* | 8/2014 | Rudi | A63F 13/71 463/42 |
| 8,819,130 B2* | 8/2014 | Thompson | G06Q 10/10 709/204 |
| 10,165,326 B1* | 12/2018 | Kline | H04N 21/4122 |
| 10,632,372 B2* | 4/2020 | Gilmore | A63F 13/30 |
| 2003/0038805 A1* | 2/2003 | Wong | A63F 13/12 345/473 |
| 2005/0046698 A1* | 3/2005 | Knight | H04N 5/2624 348/157 |
| 2007/0117617 A1* | 5/2007 | Spanton | A63F 13/12 463/29 |
| 2011/0321074 A1* | 12/2011 | Marin | H04N 21/41415 725/10 |
| 2013/0083173 A1* | 4/2013 | Geisner | G06F 3/1423 348/51 |

(Continued)

*Primary Examiner* — Steve Rowland
(74) *Attorney, Agent, or Firm* — John L. Rogitz

(57) ABSTRACT

An automated system that improves the spectating experience for a computer game or e-sport by placing spectators in locations based on their preferences, interests, demographics, and changes in emotions or behavior as the game progresses. The spectator may be moved automatically or may elect to move within the virtual space to improve the immersive experience. In some cases, the system may charge for better spectating experience. The system also detects abusive and inappropriate spectator behavior and allows such behavior to be isolated, in order to improve the spectating experience.

15 Claims, 7 Drawing Sheets

(56) References Cited

U.S. PATENT DOCUMENTS

| | | | | |
|---|---|---|---|---|
| 2014/0113718 | A1* | 4/2014 | Norman | A63F 13/497 |
| | | | | 463/31 |
| 2017/0006322 | A1* | 1/2017 | Dury | A63F 13/49 |
| 2017/0266554 | A1* | 9/2017 | Marks | A63F 13/5255 |
| 2017/0269713 | A1* | 9/2017 | Marks | G06F 3/0346 |
| 2017/0316639 | A1* | 11/2017 | Lyons | G07F 17/3211 |
| 2017/0354875 | A1* | 12/2017 | Marks | A63F 13/52 |
| 2018/0167656 | A1* | 6/2018 | Ortiz | A63F 13/355 |
| 2019/0102941 | A1* | 4/2019 | Khan | H04N 13/366 |
| 2019/0270018 | A1* | 9/2019 | Evans | G06F 3/048 |
| 2019/0341025 | A1 | 11/2019 | Omote et al. | |
| 2019/0341058 | A1* | 11/2019 | Zhang | G06N 3/0454 |
| 2019/0358540 | A1* | 11/2019 | Hilton | A63F 13/31 |

* cited by examiner

IMMERSIVE CROWD EXPERIENCE FOR SPECTATING

FIELD

The application relates generally to technically inventive, non-routine solutions that are necessarily rooted in computer technology and that produce concrete technical improvements.

BACKGROUND

Increasingly, computer simulations such as computer games not only are watched by gamers actively playing the games, but also by spectators who are not in the game. Present principles understand that spectators may be incorporated into a computer game by virtually placing them in a virtual arena or other virtual space, with the sounds and scenes presented to the spectator on a spectator device such as a smart phone including not only the game but also sounds and images from other spectators, to better emulate the experience of being in a physical arena or stadium.

SUMMARY

Accordingly, a system includes at least one processor and at least one storage accessible to the processor and comprising instructions executable by the processor to identify at least a first characteristic of at least a first spectator of a computer simulation presented on at least one display. The spectator is not an active player of the computer simulation. The instructions are executable to, based at least in part on the first characteristic, identify a location in a virtual space of the computer simulation to virtually locate the first spectator. The instructions are further executable to present on a device associated with the first spectator the computer simulation from a point of view at the location.

The computer simulation may be from a computer simulation source including a network server or a computer game console communicating with a computer simulation controller.

The first characteristic may include a facial expression indicating an emotion or a demographic profile of the first spectator or both. The first characteristic may indicate aggressive behavior on the part of the first spectator, and the instructions can be executable to on at least one display, highlight the first spectator as being aggressive.

In some example embodiments the instructions are executable to identify the location for the spectator at least in part as being a location in which other virtual spectators sharing the first characteristic are virtually located. The instructions may be executable to receive from the spectator device input indicating a foul during play of the computer simulation and use the input to present an indication of the foul on at least one display.

The computer simulation may include, for example, an e-sport or a computer game.

In another aspect, a method includes identifying at least a first characteristic of at least a first spectator of a computer simulation, and based at least in part on the first characteristic, virtually locating the spectator in a virtual space associated with the computer simulation presented on at least one display, the spectator not being an active player of the computer simulation.

In another aspect, an apparatus includes at least one computer storage that is not a transitory signal and that comprises instructions executable by at least one processor to identify a facial expression indicative of emotion and/or behavior or a demographic characteristic or both an emotion/behavior and a demographic characteristic of a spectator of a computer simulation, and based at least in part on the emotion or the demographic characteristic or both the emotion/behavior and the demographic characteristic, group the spectator with other spectators of the computer simulation.

The details of the present application, both as to its structure and operation, can best be understood in reference to the accompanying drawings, in which like reference numerals refer to like parts, and in which:

DETAILED DESCRIPTION

Figure 1:
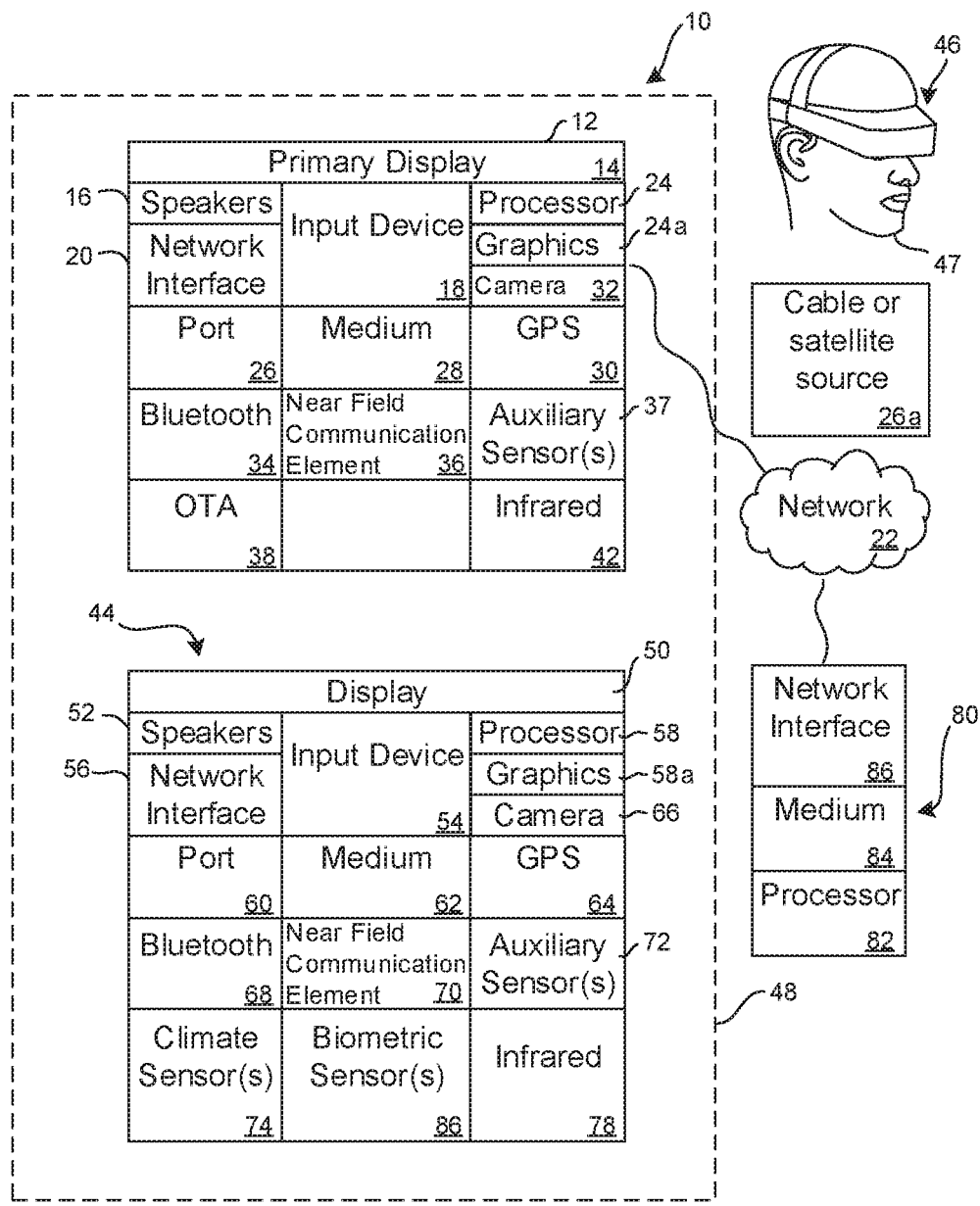
FIG. 1 is a block diagram of an example system including an example in accordance with present principles.

This disclosure relates generally to computer ecosystems including aspects of consumer electronics (CE) device networks such as but not limited to computer simulation networks such as computer game networks as well as standalone computer simulation systems. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown. In the example shown, only two CE devices 44, 46 are shown, it being understood that fewer or greater devices may be used. For example, principles below discuss multiple players 47 with respective headsets communicating with each other during play of a computer game sourced by a game console to one or more AVD 12.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller, and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12 and/or a game console, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
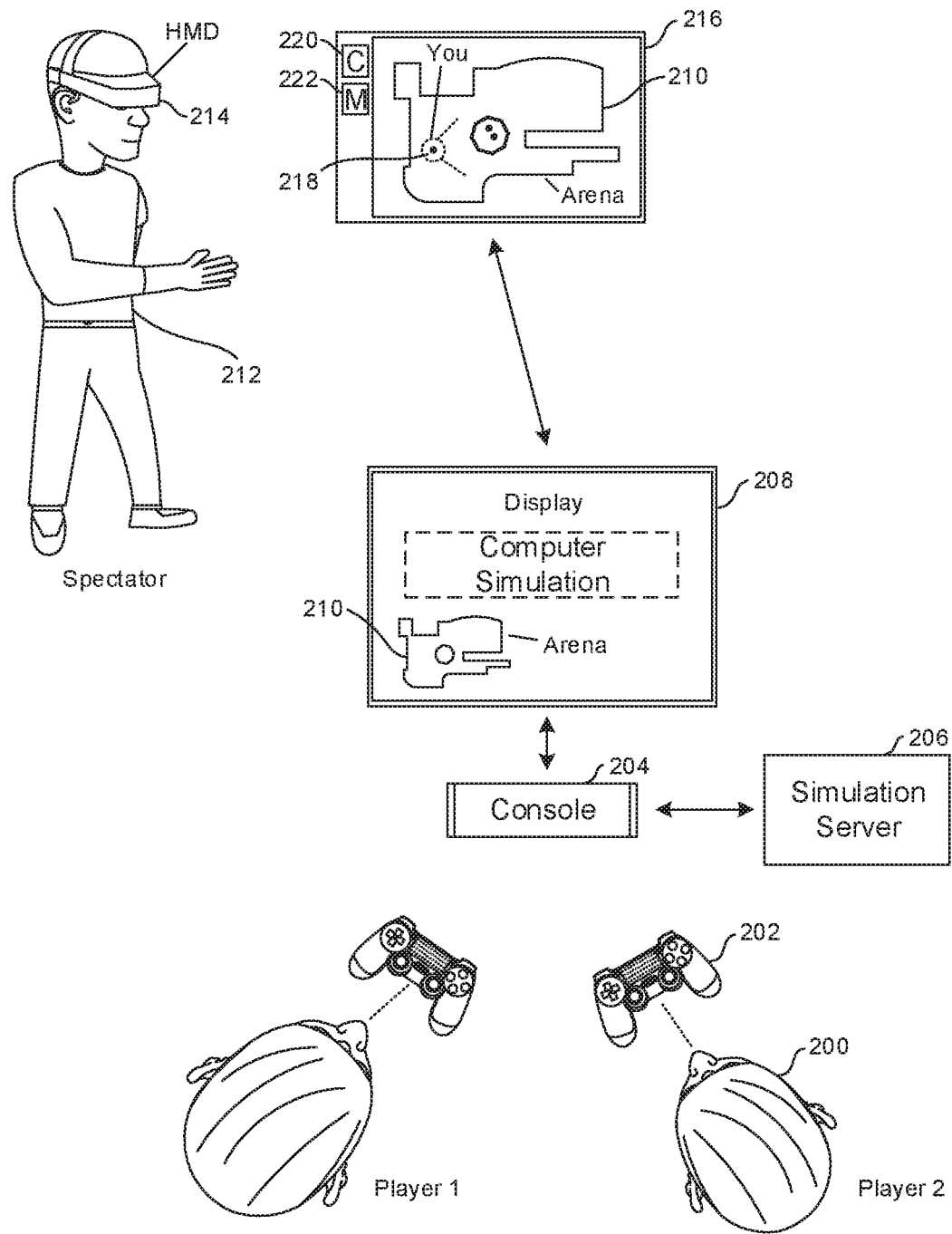
FIG. 2 schematically illustrates a computer simulation/e-sports spectator watching a computer simulation being played by others.

Now referring to FIG. 2, two (or more) computer simulation players 200 are shown playing a computer simulation such as but not limited to a computer game or e-sport by manipulating respective simulation controllers 202 to control a simulation sourced by a simulation console 204 and/or Internet server 206 for audio-video display of the simulation on one or more displays 208. In the example shown, a virtual arena 210 is shown as part of the simulation being presented on the display 208.

Additionally, one or more spectators 212 (only a single spectator shown for clarity) may observe the simulation being presented on the display 208. The spectator 212 may observe the simulation because the simulation can be provided to a display associated with the spectator, such as a virtual reality (VR) head-mounted display (HMD) 214 and/or a display 216 of a computing device such as a tablet computer, smart phone, etc. In the example shown, the virtual arena 210 is presented on the display 216 along with an indication 218 of where in the virtual arena 210 the spectator 212 is emulated to be located. The device hosting the display 216 may include any of the appropriate components discussed above in relation to FIG. 1, including a camera or other imaging device 220 and a microphone 222.

Figure 3:
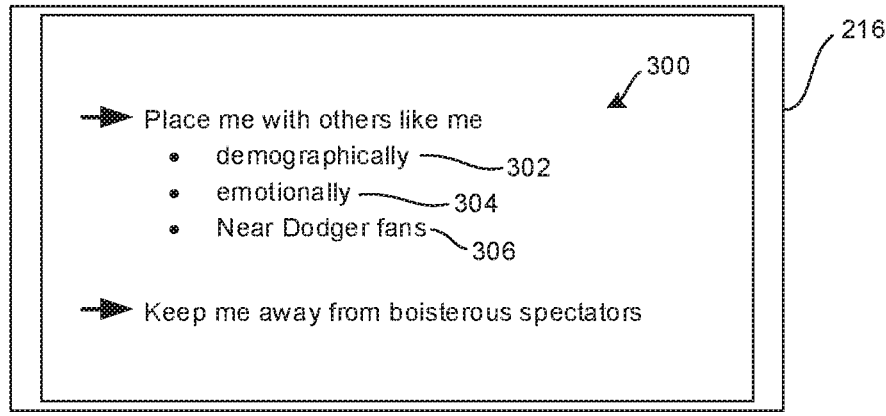
FIG. 3 is a screen shot of an example user interface (UI) allowing the spectator to define preferred locations in the virtual arena.

Attention is now drawn to FIG. 3 to illustrate a user interface (UI) 300 that may be presented on the spectator's display 216. As shown, the UI 300 may include one or more selectors to enable the spectator 212 to establish a preference to be emulated to be located in the virtual arena 210 near other spectators sharing demographic characteristics (selector 302) or emotional characteristics (selector 304). Demographic characteristics may include, without limitation, age, sex, and race. The UI 300 may also include a selector 306 to allow the spectator 212 to establish a preference to be emulated to be located in the virtual arena 210 away from emulated locations of boisterous or aggressive spectators. It is to be understood that the UI 300 also may include an option for a spectator to establish a preference to be emulated to be located in the virtual arena 210 nearby the emulated locations of boisterous or aggressive spectators. Another preference may include to be located near people cheering for a certain team or player as indicated at 306.

Figure 4:
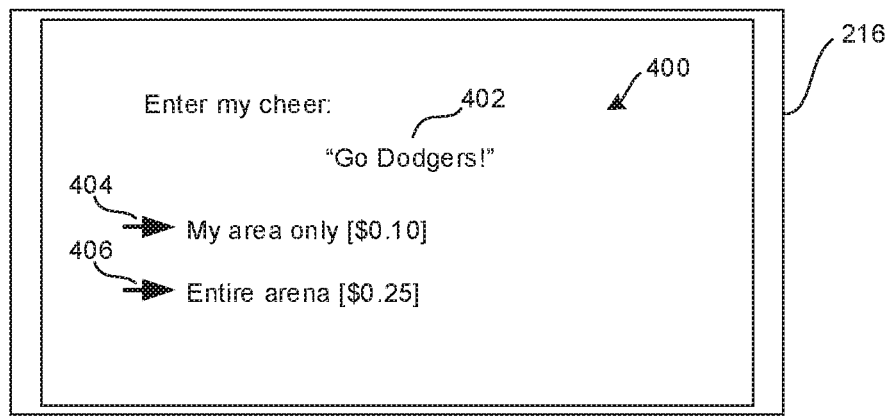
FIG. 4 is a screen shot of an example UI allowing the spectator to enter a "cheer" in the virtual arena.

FIG. 4 illustrates a UI 400 that may be presented on the spectator's display 216 to enable the spectator 212 to enter into the computer simulation certain text or other input, including voice. For example, as indicated at 402 the spectator 212 may enter a cheer for a particular team in an e-sport simulation. A first selector 404 may be presented allowing the spectator to designate, for a listed fee as shown, to cause the cheer to be presented only on displays of other spectators in the virtual section of the arena 210 in which the spectator 212 is emulated to be located. A second selector 406 may be presented allowing the spectator to designate, for a listed fee as shown that may be different from the fee associated with the first selector 404, to cause the cheer to be presented on displays of all other spectators emulated to be located in the arena 210.

Figure 5:
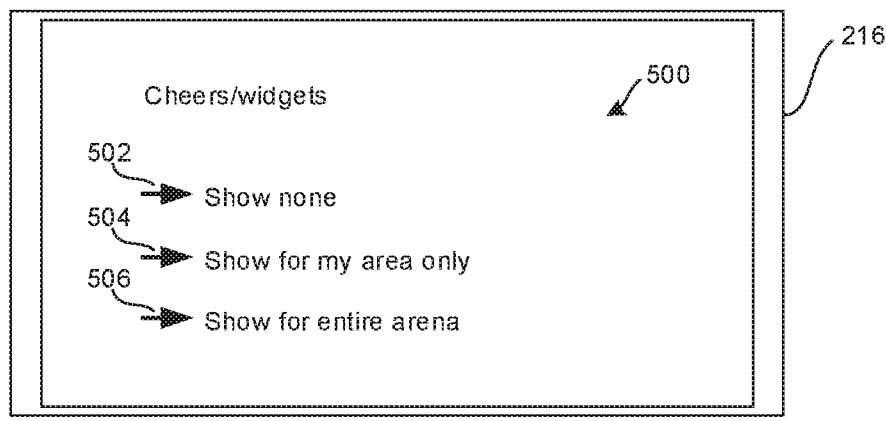
FIG. 5 is a screen shot of an example UI allowing the spectator to define what the spectator wants to see and/or hear in the virtual arena.

FIG. 5 illustrates a UI 500 that may be presented on the spectator's display 216 to enable the spectator 212 to enter preferences as to what cheers or widgets or other interactive content entered by other spectators of the computer simulation that the spectator 212 wishes to be presented on the display 216. A first selector 502 may be provided to enable the spectator 212 to enter a preference to see no other interactive content from other spectators. A second selector 504 may be provided to enable the spectator 212 to enter a preference to see interactive content only from other spectators emulated to be in the same section or area of the arena 210 as the spectator 212. Yet a third selector 506 may be provided to enable the spectator 212 to enter a preference to see all interactive content from other spectators in the arena 510.

Figure 6:
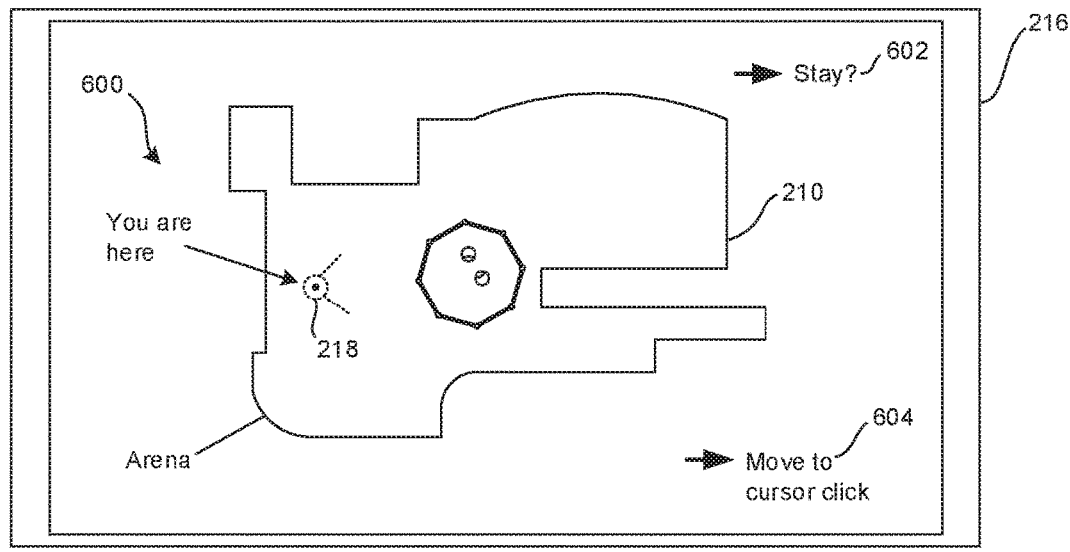
FIG. 6 is a screen shot of an example UI allowing the spectator to move in the virtual arena.

FIG. 6 illustrates a UI 600 that may be presented on the spectator's display 216 to enable the spectator 212 to select, as indicated at 602, to remain in the spectator's emulated location 218. The UI 600 may also present a prompt 604 or otherwise enable the spectator to move the emulated location of the spectator to other locations in the arena 210 using, e.g., a drag-and-drop manipulation of an input device.

Figure 7:
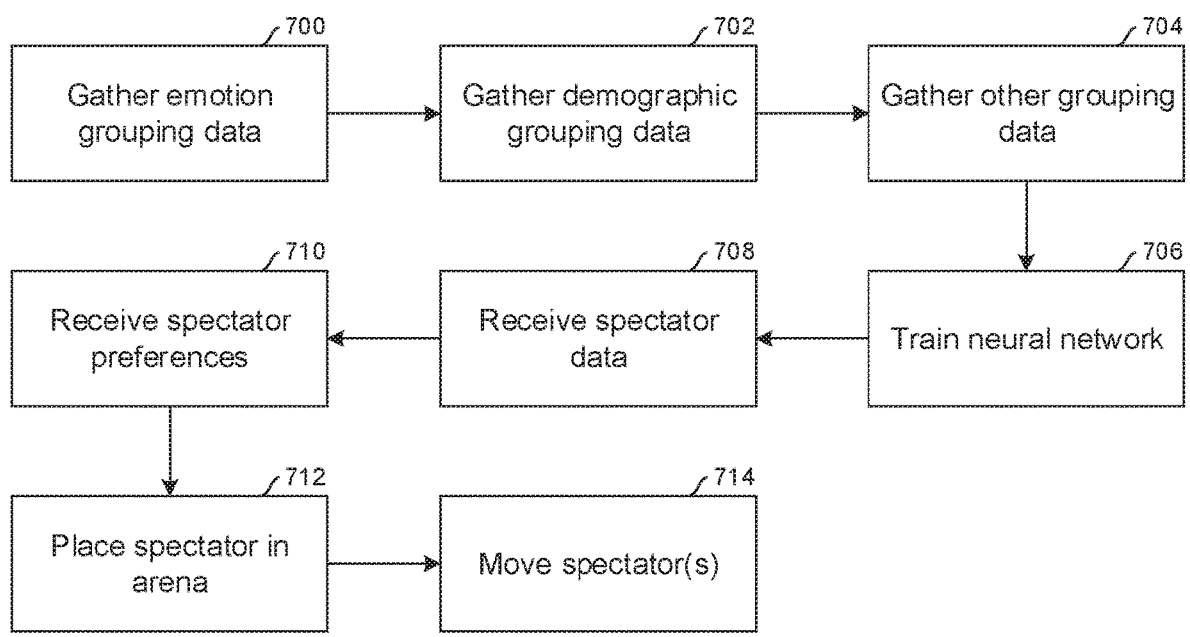
FIG. 7 is a flow chart of example logic consistent with present principles.

Turning now to FIG. 7, example logic consistent with present principles may be seen. Commencing at block 700, emotion grouping information is gathered based on, e.g., input from spectator cameras (images of the spectators' face), microphones (spectator voice input), text input on the spectator device, etc. This emotion-indicating input may be fused such that camera images, audio, or text and combinations thereof may be used. A non-limiting technique for multi-modal emotion recognition is set forth in the present assignee's U.S. patent application Ser. No. 16/383,896, incorporated herein by reference.

Additionally, based on input from spectators or image recognition executed on images from, e.g., spectator cameras or the languages spoken by the spectators as recognized from audio from microphones, demographic grouping information may be recorded at block 702.

Furthermore, additional grouping information may be gathered at block 704, in addition to demographic and emotion data pertaining to the spectators.

Figure 11:
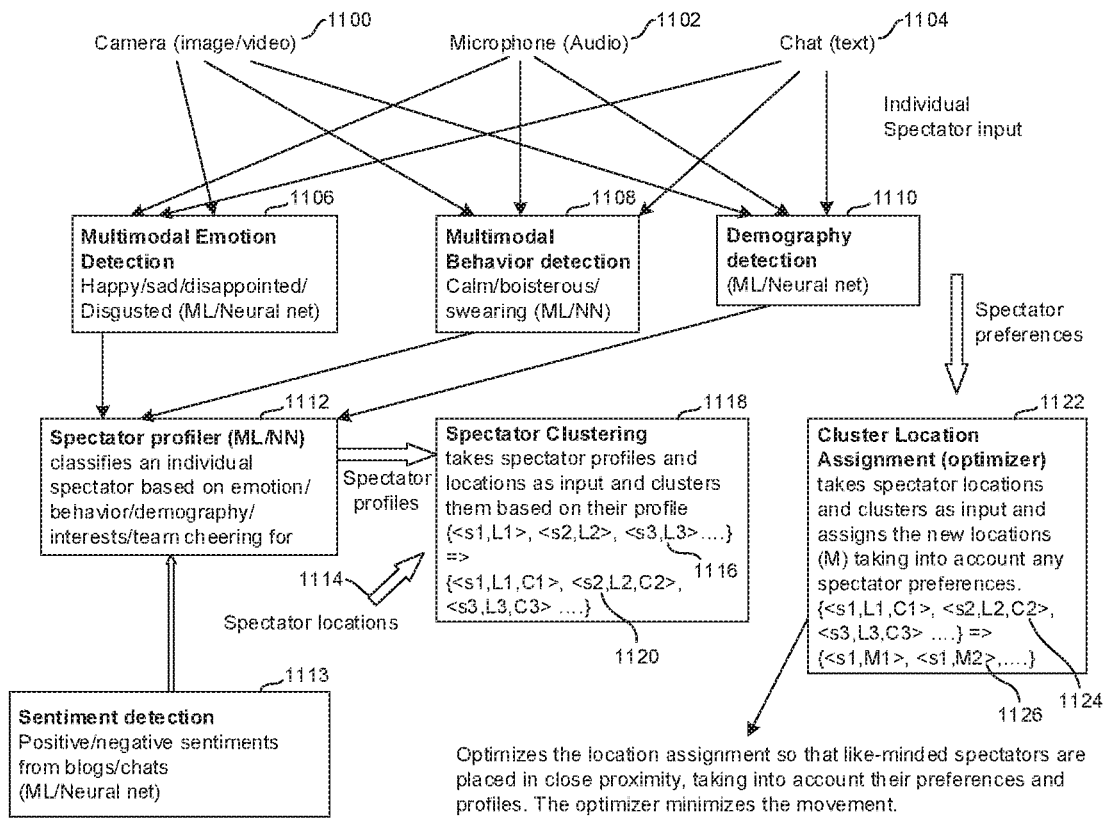
FIG. 11 schematically illustrates attributes of neural network (NN)/machine learning principles consistent with present principles.

Moving to block 706, one or more neural networks (NN) are trained on recognizing the data obtained in blocks 700-704. Note that training may be accomplished using emotion and demographic data from other sources or from initial input from the spectators themselves. FIG. 11 discussed further below provides additional details.

Subsequently, during spectating of the computer simulation, at block 708 spectator 212 information may be received from, e.g., the camera 220 and/or microphone 222 shown in FIG. 2. This information may be used by the NN trained at block 706 to ascertain the spectator's emotion and/or demographics as indicated above.

In the event that the spectator 212 has entered location preferences using, e.g., the UI 300 of FIG. 3, this information is received at block 710, which also may be input to the NN trained at block 706. Then at block 712 the spectator is virtually located in the arena 210 based on one or more of the spectator's demographic information (e.g., locating the spectator near the emulated locations of other spectators of similar demographics), the spectator's emotional state (e.g., locating the spectator near the emulated locations of other spectators of similar emotional states and/or behavior), and the spectator's entered preferences. If desired, the emulated location of the spectator 212 in the arena 210 may be moved at block 714 by the spectator 212 operating the UI 600 of FIG. 6 or automatically, e.g., in response to the spectator indicating a preference using the UI 300 of FIG. 3.

Thus, spectators of the computer simulation are grouped into what can be thought of as "bubbles" or regions inside the virtual arena 210. A spectator may move between bubbles as the spectator's emotional state changes or interest changes. A spectator may be locked to a particular bubble as indicated in FIG. 6, with a spectator community being built around a bubble of similar spectators. In grouping by emotional state, a nominal grouping may simply be positive sentiment and negative sentiment on opposite sides of the arena 210, with the groupings being refined and divided further from there.

Figure 8:
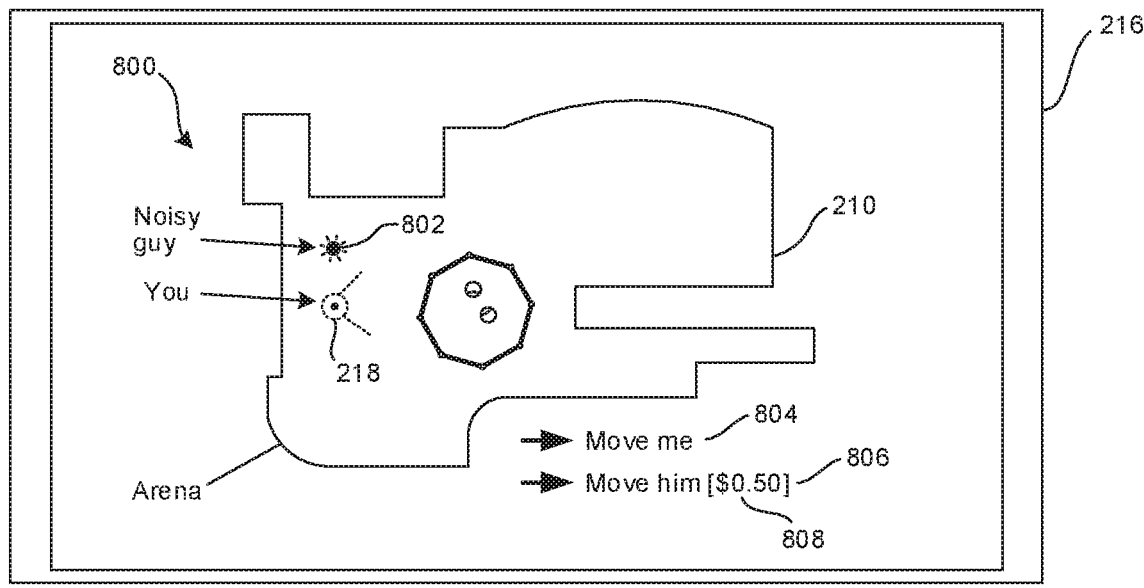
FIG. 8 is a screen shot of an example UI allowing the spectator to distance himself from a boisterous spectator.

Reference is now made to FIG. 8, showing a UI 800 that may be presented on the spectator's display 216. As shown, the UI 800 may show the arena 210 and the emulated location 218 of the spectator 212. The UI 800 also may show an emulated location 802 of a boisterous or aggressive spectator, with boisterousness or aggressiveness being determined based on, e.g., text or microphone input from the boisterous spectator and/or based on image recognition of expression and/or gestures/motion executed on camera images of the spectator.

The UI 800 may include a first selector 804 to allow the spectator 212 to move his or her emulated location away from the noisy spectator. Note that the spectator 212 may be "moved" either by virtue of moving the emulated location of the spectator 212 in the arena 210, or by suppressing, from the device associated with the display 216, input from the noisy spectator. The end effect of moving is that the spectator's field of view changes.

The UI 800 also may include a selector 806 to permit the spectator 212 to move the emulated location of the noisy spectator ("noisy" being an example of inappropriate behavior, along with abusive, egregious, etc.) in the arena 210, e.g., to the opposite side of the virtual arena or outside the virtual arena altogether. A fee 808 may be indicated as being charged to the account of the spectator 212 for this service.

Figure 9:
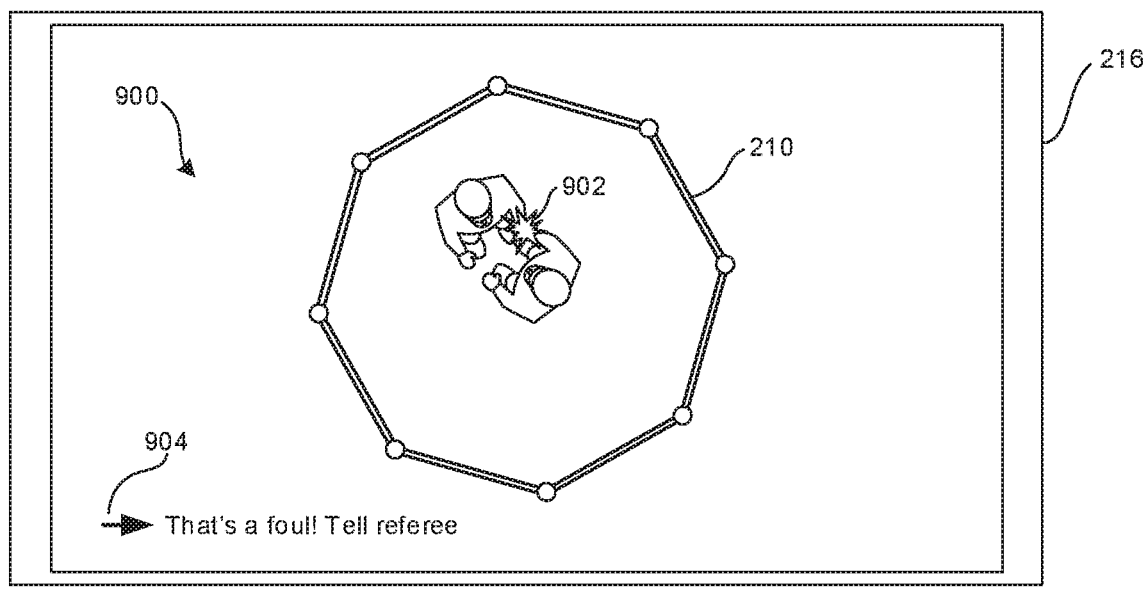
FIG. 9 is a screen shot of an example UI allowing the spectator to assist a game referee in calling a foul.

Now referring to FIG. 9, a UI 900 is illustrated as being presented on the spectator's display 216 illustrating action 902 in the virtual arena 210 that may constitute a foul, in the example shown, a low hit on a simulation character. The spectator 212 can be allowed to enter a charge of foul 904 that can be sent to a device of a referee of the computer simulation to assist the referee in calling penalties or fouls in the computer simulation.

Figure 10:
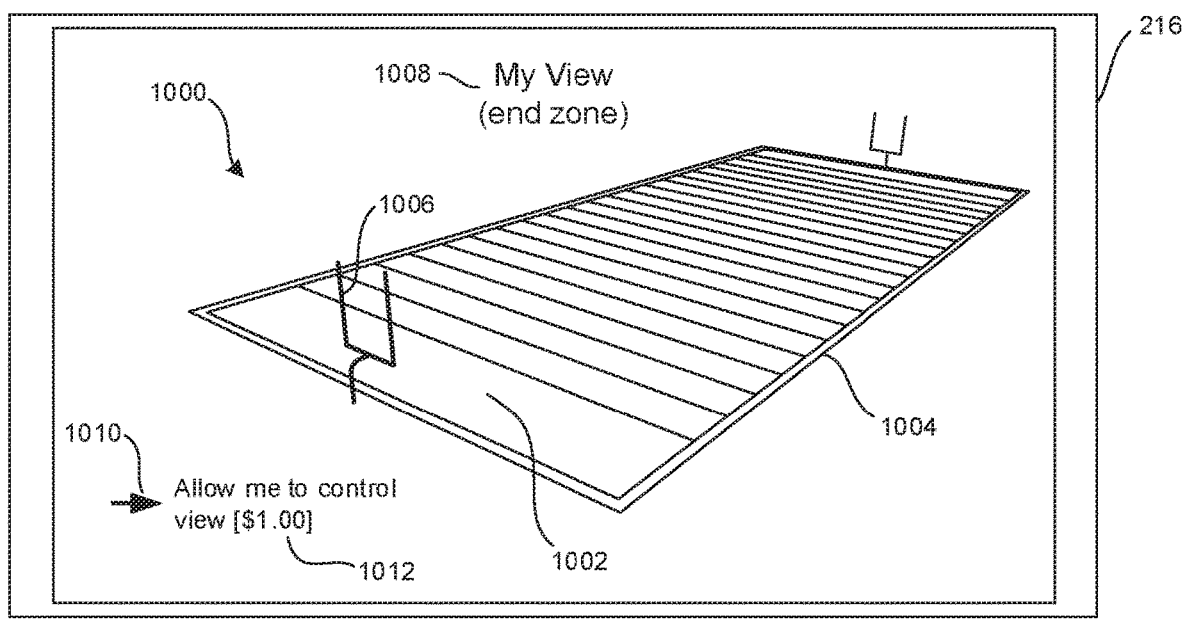
FIG. 10 is a screen shot of an example UI allowing the spectator to control the arena view of the spectator.

FIG. 10 illustrates a UI 100 that can be presented on the spectator's display 216 illustrating the arena 210 from the perspective of the emulated location of the spectator 212 in the arena 210. In the example shown, the emulated location of the spectator 212 is just back from an end zone 1002 of a football field 1004 having goal posts 1006. The UI 1000 may include an indication 1008 of the emulated location being depicted. A selector 1010 may be provided to allow the spectator 212 to control the view shown on the display 216 if desired for an indicated fee 1012. Note that by agreeing to pay the fee, the spectator 212 may be permitted to rotate, magnify, or otherwise control the view of the football 1004 shown on all displays of spectators in the arena section the spectator 212 is emulated to be in. Such control may be afforded in other embodiments without paying a fee.

Now referring to FIG. 11, inputs 1100 from images (still or video cameras), 1102 (sound from microphones), 1104 (text as from chat messages) sensing spectator activities may be made to one or more NN detection modules. In the example shown, all three inputs 1100, 1102, 1104 are provided to a multimodal emotion detection module 1106, which is trained to determine from the inputs the emotion of the spectator that is the subject of the inputs, e.g., happy, sad, disappointed, disgusted. To this end, reference is made to the above-referenced U.S. patent application Ser. No. 16/383, 896. Also, all three inputs 1100, 1102, 1104 may be provided to a multimodal behavior detection module 1108, which is trained to determine from the inputs the behavior of the spectator that is the subject of the inputs, e.g., calm, boisterous, profane, etc. Further, all three inputs 1100, 1102, 1104 can be provided to a multimodal demographics detection module 1110, which is trained to determine from the inputs the demographics of the spectator that is the subject of the inputs, e.g., race, age, etc.

As illustrated in FIG. 11, the outputs of the modules 1106, 1108, 1110 are provided to another NN 1112 that is labeled "spectator profiler" in FIG. 11. Also provided as input to the spectator profiler 1112 may be sentiments as generated by a sentiment detection module 1113, which may be implemented by a NN that takes as input information from blogs and chats and analyzes the blogs/chats for terms and phrases indicative to sentiment.

Based on its inputs, the spectator profiler 1112 classifies an individual spectator, i.e., classifies the spectator based on emotion/behavior/demography/interests/team the spectator is cheering for. The individual spectator profiles with respective locations 1114 of the respective spectators from the NN 1112 (as indicated at 1116) are sent to a clustering module 1118 which clusters spectators based on common profile characteristics (as indicated at 1120, with the "C" designations indicating the number of each cluster the individual spectators are assigned to).

The spectator clusters 1120 may then be provided to an optimizer 1122, which may be implemented by yet another NN to receive spectator locations and clusters (indicated at 1124, which may be the same as 1116) as input and assign new locations (M, indicated at 1126) to one or more individual spectators taking into account any spectator preferences as mentioned above. Preferably, the optimizer 1122 optimizes the location assignments so that like-minded spectators are placed in close proximity, taking into account their preferences and profiles, while, if desired, keeping spectator movement to a minimum within the constraints above.

It will be appreciated that whilst present principals have been described with reference to some example embodiments, these are not intended to be limiting, and that various alternative arrangements may be used to implement the subject matter claimed herein.

What is claimed is:

1. A system comprising:
at least one processor configured with code to:
identify at least a first characteristic of at least a first spectator of a computer simulation presented on at least one display, the spectator not being an active player of the computer simulation;
based at least in part on the first characteristic, identify a location in a virtual space of the computer simulation to virtually locate the first spectator;
present on a device associated with the first spectator the computer simulation from a point of view at the location; and
wherein the first characteristic indicates aggressive behavior on the part of the first spectator, and the processor is configured to:
on at least one display, highlight the first spectator as being aggressive.

2. The system of claim 1, wherein the computer simulation is from a computer simulation source comprising a network server.

3. The system of claim 1, wherein the computer simulation is from a computer simulation source comprising a computer game console communicating with a computer simulation controller.

4. The system of claim 1, wherein the first characteristic comprises a demographic profile of the first spectator.

5. The system of claim 1, wherein the processor is configured with code to:
identify the location at least in part as being a location in which other virtual spectators sharing the first characteristic are virtually located.

6. The system of claim 1, wherein the processor is configured with code to:
receive from the spectator device input indicating a foul during play of the computer simulation; and
use the input to present an indication of the foul on at least one display.

7. The system of claim 1, wherein the computer simulation comprises an e-sport.

8. The system of claim 1, wherein the computer simulation comprises a computer game.

9. A method, comprising:
identifying at least a first characteristic of at least a first spectator of a computer simulation; and
based at least in part on the first characteristic, virtually locating the spectator in a virtual space associated with the computer simulation presented on at least one display, the spectator not being an active player of the computer simulation, wherein the first characteristic indicates aggressive behavior on the part of the first spectator, and the method comprises:
on at least one display, highlighting the first spectator as being aggressive.

10. The method of claim 9, comprising:
presenting on a device associated with the first spectator the computer simulation from a point of view at the location.

11. The method of claim 9, wherein the first characteristic comprises a demographic profile of the first spectator.

12. The method of claim 9, comprising:
virtually locating the spectator in a virtual space at a location at least in part as being a location in which other virtual spectators sharing the first characteristic are virtually located.

13. The method of claim 9, comprising:
receiving from a device associated with the spectator input indicating a foul during play of the computer simulation; and
using the input to present an indication of the foul on at least one display.

14. An apparatus, comprising:
at least one computer storage that is not a transitory signal and that comprises instructions executable by at least one processor to:
using at least one neural network, identify an emotion of a spectator of a computer simulation;
based at least in part on the emotion group the spectator with other spectators of the computer simulation;
group the spectator with other spectators of the computer simulation by locating the spectator nearby the other spectators in virtual space; and in some cases, charge the spectators when moving locations with a better view of the sport.

15. An apparatus, comprising:
at least one computer storage that is not a transitory signal and that comprises instructions executable by at least one processor to:
group at least a first spectator of a computer simulation with at least a second spectator of the computer simulation; and
allow the first spectator to indicate inappropriate behavior of the second spectator such that responsive to the behavior of the second spectator being identified as inappropriate, the second spectator is moved to another virtual location inside or outside an emulated area of the computer simulation.

* * * * *